(12) United States Patent
McCabe

(10) Patent No.: US 9,363,199 B1
(45) Date of Patent: Jun. 7, 2016

(54) BANDWIDTH MANAGEMENT FOR DATA SERVICES OPERATING ON A LOCAL NETWORK

(71) Applicant: Western Digital Technologies, Inc., Irvine, CA (US)

(72) Inventor: Timothy J. McCabe, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 81 days.

(21) Appl. No.: 13/802,380

(22) Filed: Mar. 13, 2013

(51) Int. Cl.
H04L 12/927 (2013.01)

(52) U.S. Cl.
CPC .................................. *H04L 47/801* (2013.01)

(58) Field of Classification Search
CPC ............... H04L 47/00; H04L 47/2408; H04L 47/24016; H04L 47/10–47/829; H04L 41/08–41/0896; H04L 12/5695
USPC ............................ 370/229–240; 709/223–226
See application file for complete search history.

(56) References Cited

U.S. PATENT DOCUMENTS

| | | | |
|---|---|---|---|
| 6,631,135 B1 | 10/2003 | Wojcik | |
| 7,257,640 B1 * | 8/2007 | Callocchia et al. | 709/233 |
| 7,324,523 B2 * | 1/2008 | Dacosta | H04L 41/0896 370/345 |
| 8,000,239 B2 | 8/2011 | Marcondes et al. | |
| 8,516,121 B1 * | 8/2013 | Telang | H04L 67/1097 707/640 |
| 8,521,883 B1 * | 8/2013 | Wartnick | H04L 43/0888 709/226 |
| 2005/0089067 A1 * | 4/2005 | Kinoshita et al. | 370/503 |
| 2006/0039333 A1 * | 2/2006 | Pirzada et al. | 370/338 |
| 2008/0112320 A1 * | 5/2008 | van Willigenburg | H04L 41/0896 370/235 |
| 2008/0209017 A1 * | 8/2008 | Shuster | H04L 29/06 709/221 |
| 2008/0259841 A1 | 10/2008 | Deshpande | |
| 2011/0238626 A1 * | 9/2011 | Hao | G06F 11/1458 707/644 |
| 2012/0311176 A1 * | 12/2012 | Dellinger et al. | 709/232 |
| 2013/0024581 A1 * | 1/2013 | Myhill | G06F 11/1464 709/230 |
| 2014/0032781 A1 * | 1/2014 | Casey et al. | 709/233 |

* cited by examiner

*Primary Examiner* — Mark Rinehart
*Assistant Examiner* — Kenneth P Hunt

(57) ABSTRACT

A bandwidth manager associated with a local network may comprise memory that stores network load data for the local network and one or more processors. The processors can be configured to: receive a request for bandwidth from a first data service operating on a first computing device on a local network; determine available bandwidth for the first computing device based on the network load data for the local network; allocate a first bandwidth to the first computing device based in part on the available bandwidth; and adjust the allocated first bandwidth based in part on network load during a data transmission by the first computing device.

21 Claims, 5 Drawing Sheets

BANDWIDTH MANAGEMENT FOR DATA SERVICES OPERATING ON A LOCAL NETWORK

BACKGROUND

As more and more devices have network connections, traffic on local networks has increased greatly. For example, a local network on a home could have multiple TVs streaming video, game devices playing online games, computing devices browsing the network, and/or storage devices backing up data or performing other data services. With multiple data streams occurring simultaneously, traffic on the local network can conflict with each other, thereby lowering network performance (e.g., bandwidth and/or latency) on the local network.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

With the many devices on a local network competing for access to network bandwidth (e.g., local and outgoing bandwidth), there is a bandwidth management system for coordinating data services on the local network, which can involve large data transfers, such as during backup operations. Various aspects of the bandwidth management system will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Figure 1:
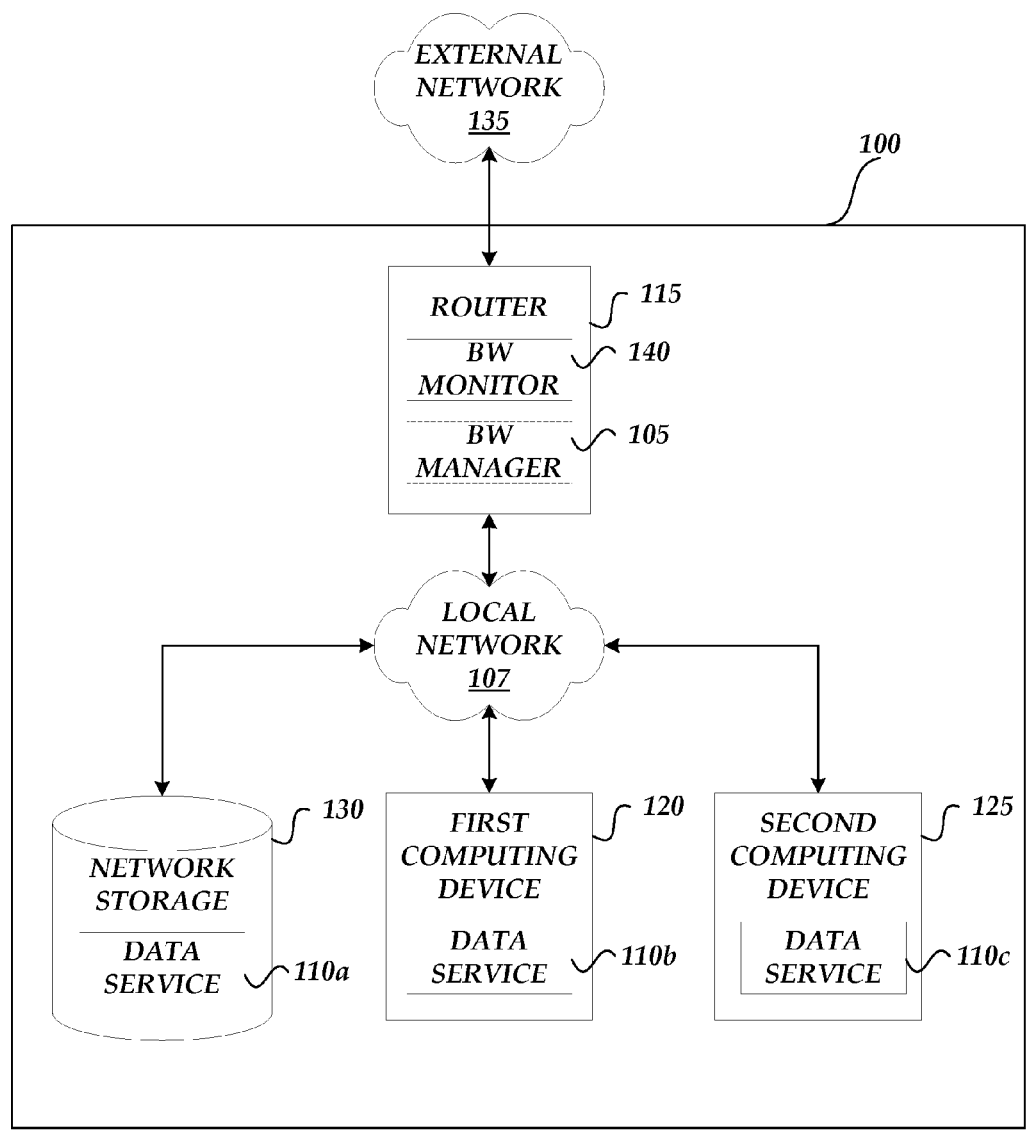
FIG. 1 illustrates a block diagram of an embodiment of a bandwidth management system that coordinates data services operating on a local network.

FIG. 1 illustrates a block diagram of an embodiment of a bandwidth management system 100. The bandwidth management system can coordinate data services, such as for backup operations, operating on the local network to more efficiently transfer data on the local area network. For example, the bandwidth management system can monitor traffic on the network and determine whether to initiate data backup transfer or delay transfers until traffic on the network is reduced. In some embodiments, the bandwidth management system can allocate bandwidth to the data services and update the allocated bandwidth as available bandwidth on the local network changes.

In the illustrated embodiment, the bandwidth management system includes a bandwidth manager 105 that coordinates multiple data services 110a-c operating on the local network 107 (e.g., a local area network (LAN)). In FIG. 1, the bandwidth manager 105 operates on a router (or other networking device such as a gateway or switch), but may operate in other devices in other embodiments (e.g., see FIG. 2). In one embodiment, the functionally of the bandwidth manager may be distributed across several devices.

Data services 110a-c operating on the devices on the local network 107 can provide backup and/or other storage related functionality on the local network 107. In one embodiment, the data services comprise backup applications operating on the devices on the network. For example, data services 110b, 110c may be backup software running on the first and second computing devices (e.g., laptop, tablet, smart phone, computer, etc.). Those data services 110b, 110c can communicate with a data service 110a on one or more network attached storage devices (NAS) 130 or other network storage. In one embodiment, each of the NAS 130 may comprise one or more storage devices (e.g., hard disk drives, solid state drives or hybrids thereof) and a network interface that is configured to couple to the local network 107. The NAS data service 110a can receive backup data from the backup applications and store that data on the NAS 130.

In some situations, all computing devices on the local network 107 have data services operating on them. In other situations, only some computing devices have data services operating on them.

In one embodiment, the NAS data service 110a backs up data on the network storage 130 to an external network 135, such as a cloud storage service, off-site backup storage device or other storage device on an outside network.

In some embodiments, the data services 110a-c request bandwidth from the bandwidth manager 105 before initiating the backup data transfer (or other type of data transfer). The bandwidth manager 105 obtains network load data from the bandwidth monitor 140, such as available outgoing bandwidth, local bandwidth usage and/or local latency, to determine available bandwidth on the local network for the request from the data services. The bandwidth manager 105 can then allocate the available bandwidth to one or more requesting data services. In some embodiments, the bandwidth manager 105 determines a delay for the data service, in an attempt to hold off the data transfer until the network load has decreased.

In some cases, the allocated bandwidth can include local network bandwidth and/or outgoing network bandwidth (e.g., over a cable modem, digital subscriber line (DSL) modem, fiber modem or wireless modem). Typically, in most networks, local bandwidth is significantly greater than outgoing bandwidth. For example, many local networks operate at 100-1000 Megabits, with some local networks (e.g., fiber networks) operating at even faster speeds. However, outgoing high speed bandwidth speeds are commonly in the 1-10 Megabits range. Thus, the bottleneck on external bound traffic from local networks is often the available outgoing bandwidth.

In one embodiment, the bandwidth monitor 140 operates on the router 115. The bandwidth monitor can collect network load data on the network, for example, by monitoring packet flows through the router. In one embodiment, the bandwidth monitor comprises a database or other data repository for network load data. For example, the bandwidth monitor 140 may keep data on the current amount of traffic on the network, the number of dropped packets on the network, the latency on the network, and/or various other network statistics.

Figure 2:
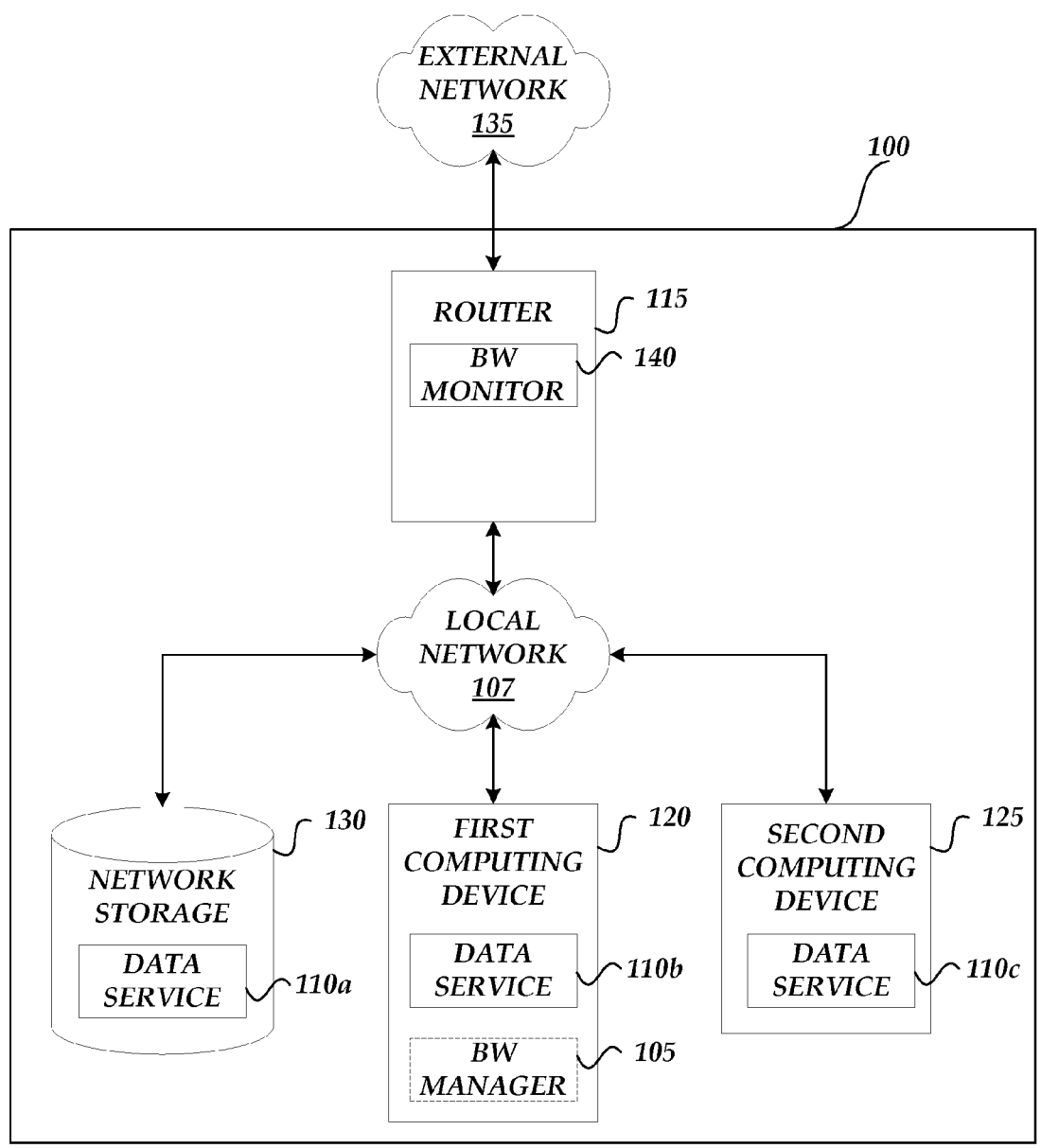
FIG. 2 illustrates a block diagram of another embodiment of the bandwidth management system.

FIG. 2 illustrates a block diagram of another embodiment of the bandwidth management system 100 of FIG. 1. As described above and shown in FIG. 2, the bandwidth manager 105 may operate on other devices on the local network 107, such as the first computing device 120. The bandwidth manager 105 may also operate on other components of the bandwidth management system 100, such as the network storage device 130 or other computing devices on the local network 107. In some cases, the functionality of the bandwidth manager 105 may be distributed over several components, such as over the data services 110a-c operating on the various components of the bandwidth management system 100.

Figure 3:
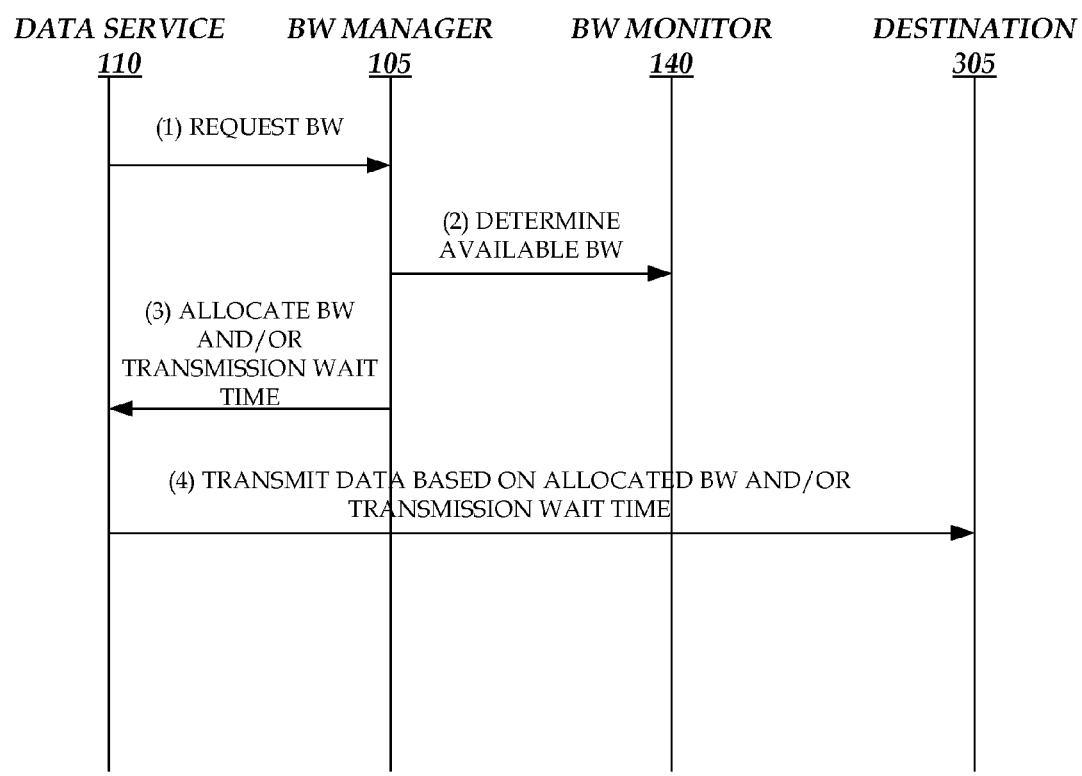
FIG. 3 illustrates a flow chart of an embodiment of communications occurring on the local network.

FIG. 3 illustrates a flow chart of an embodiment of the data flow on the local network 107 of FIG. 1. The data flow is discussed in the context of an example scenario that is intended to illustrate, but not to limit, various aspects of the bandwidth management system 100.

At flow (1), one or more data services 110 (e.g., data service 110a, 110b and/or 110c) requests a bandwidth allocation from the bandwidth manager 105 for a first data service (e.g., backup up data to the NAS). At flow (2), the bandwidth manager obtains network load data from the bandwidth monitor 140 and determines the available bandwidth on the local network 107.

At flow (3), the bandwidth manager allocates the available bandwidth to the one or more requesting data services 110 and/or allocates a transmission wait time to the one or more requesting data services 110. For example, the bandwidth manager 105 may instruct a data service 110 to transmit at no more than a first bandwidth amount and to wait a first amount of time (e.g., 1 minute, 10 minutes, 1 hr., etc.) before beginning the data transfer. In one example scenario, if video is being streamed on the network, the bandwidth manager 105 may set a cap for and/or shift the data transfer from the data service 110 in order to limit interference with the video streaming. Once the video streaming is over, the bandwidth manager 105 can update the allocated first bandwidth to a higher bandwidth, assuming there is greater bandwidth availability (e.g., local and/or outgoing bandwidth) on the local network 107. At flow (4), the data service 110 transmits the data to the destination device 305 based on the allocated bandwidth and/or transmission wait time. In some cases, the destination device 305 may be on the local network (e.g. the network storage 130) or on an external network 135 (e.g., a cloud service).

Figure 4:
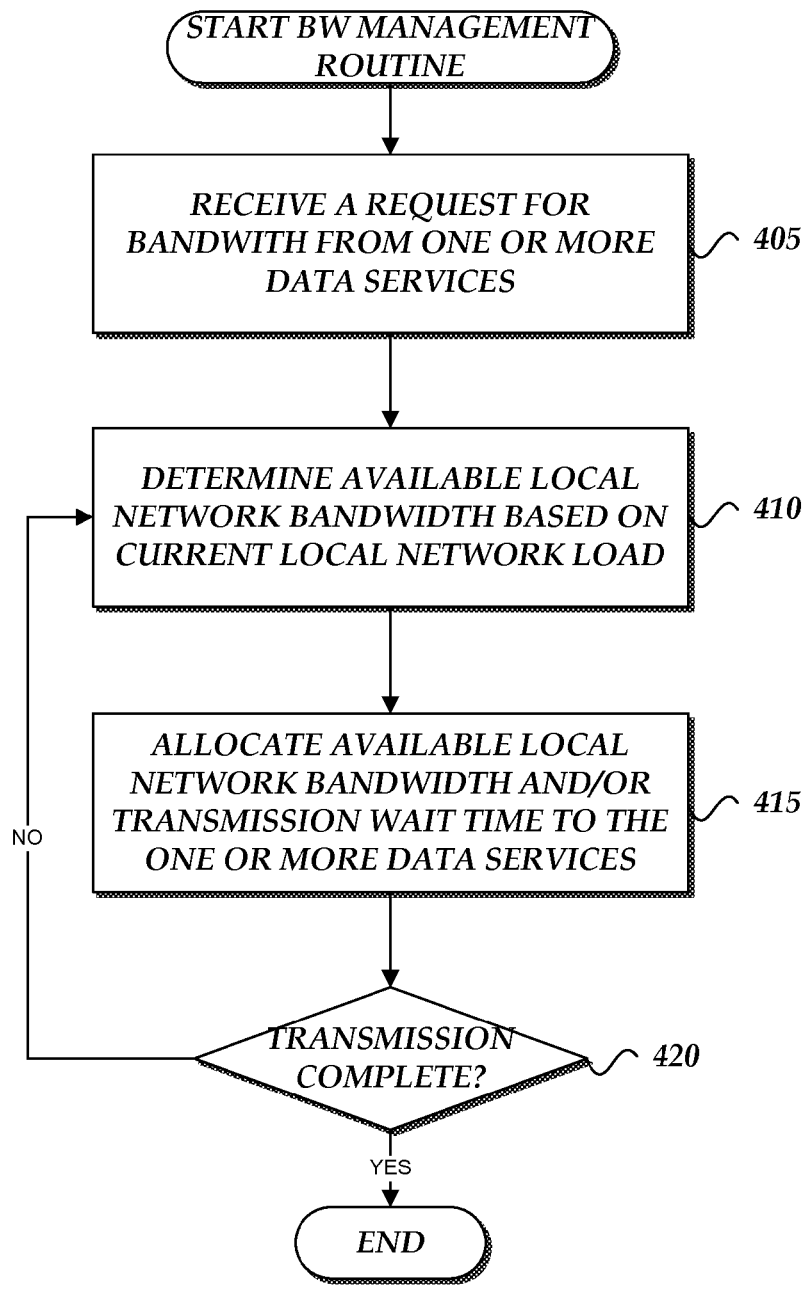
FIG. 4 illustrates a flow chart of an embodiment of a bandwidth management routine for local traffic.
Figure 5:
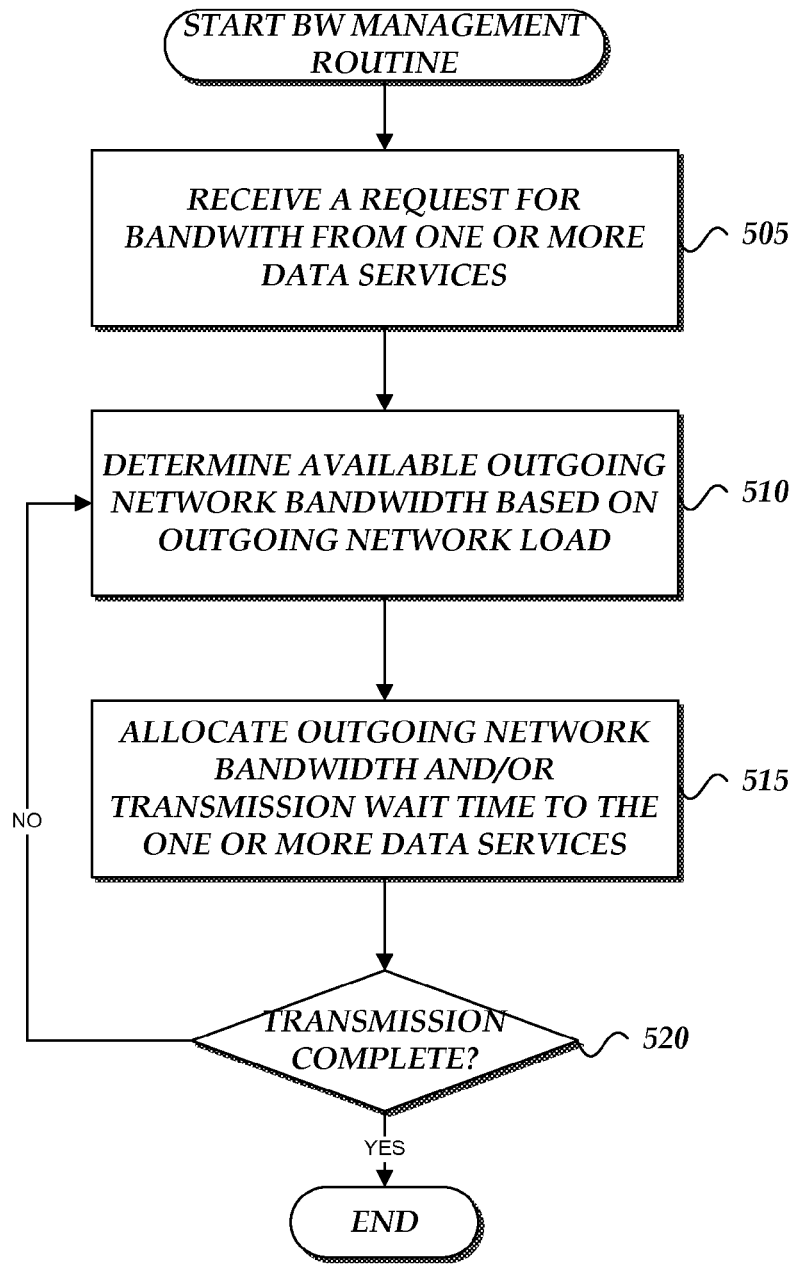
FIG. 5 illustrates a flow chart of an embodiment of a bandwidth management routine for outgoing traffic on the local network.

FIG. 4 illustrates a flow chart of an embodiment of a bandwidth management routine 400 for available local bandwidth. FIG. 5 illustrates a flow chart of an embodiment of a bandwidth management routine 500 for available outgoing bandwidth. The routines 400, 500 may be performed together (e.g., in parallel or at least partially overlapping) or separately. In some embodiments where the routines are performed together, some of the blocks performed may be combined. In some implementations, the routines 400, 500 are performed by embodiments of the bandwidth management system 100 described with reference to FIG. 1 or by one of its components, such as the bandwidth manager 105. For ease of explanation, the following describes the routines as performed by the bandwidth manager 105. The routines are discussed in the context of an example scenario that is intended to illustrate, but not to limit, various aspects of the bandwidth management system 100.

Beginning with FIG. 4, in block 405, the bandwidth manager 105 receives a request for bandwidth from one or more data services 110. For example, a data backup application on a laptop may be attempting to backup data on the laptop to the network storage 130 of FIG. 1.

At block 410, the bandwidth manager 105 determines available local network bandwidth based on the current local network load. In one embodiment, the bandwidth manager 105 obtains network load data from the bandwidth monitor 140 of FIG. 1. For example, the bandwidth manager 105 can determine the maximum local bandwidth capability of the local network 107 and the current usage of the local bandwidth. It can then subtract the current usage from the maximum capability to determine the available bandwidth.

At block 415, the bandwidth manager 105 allocates available bandwidth between the one or more requesting data services 110. For example, the bandwidth manager 105 can divide the available bandwidth between all the requesting data services 110. In some embodiments, the bandwidth manager 105 may reserve a certain amount of bandwidth (e.g., a buffer amount) to even out spikes on the bandwidth usage. For example, the manager 105 may subtract the buffer amount from the available bandwidth to determine a revised available bandwidth and then allocate the revised available bandwidth among the requesting data services.

At decision block 420, the bandwidth manager 105 determines whether the data transmission (e.g., a backup data transfer) from the data service 110 is complete. The monitoring of the transmission may be carried out periodically, at an interval determined programmatically or as determined by a user, through a suitable user interface. Alternatively, according to one embodiment, the monitoring may be event-driven.

In cases where the bandwidth manager 105 is handling requests form multiple data services 110, the bandwidth manager can determine whether each of the transmissions associated with each of the data services has completed. If the transmissions are complete, the routine 400 can end. If the one or more of the transmissions are still ongoing, the routine proceeds back to block 410 so that the bandwidth manager 105 can determine if the network load has changed on the local network 107 and re-allocate bandwidth as needed. For example, if network load has decreased, the bandwidth manager 105 can allocate more bandwidth to the one or more data series 110, thereby allowing their data transmission to complete more quickly. In some cases, the bandwidth manager 105 can determine that network load has actually increased and can further cap the bandwidth allocated to the data services 110 or even halt data transfers from the data services 110 until more bandwidth becomes available. Typically, data transfers from the data services (e.g., data backups) can be time-shifted without materially affecting users of the data services. By managing the data services on the local network 107, the bandwidth manager 105 can enhance to responsiveness of other transfers occurring on the local network 107 that may be more sensitive to network speeds (e.g., video streaming, voice over IP, online gaming, etc.).

Referring now to FIG. 5, in block 505, the bandwidth manager 105 receives a request for bandwidth from one or more data services 110. For example, a data backup application on a laptop may be attempting to backup data on the laptop to a cloud storage service.

At block 510, the bandwidth manager 105 determines available outgoing network bandwidth based on the current local network load. In one embodiment, the bandwidth manager 105 obtains network load data from the bandwidth monitor 140 of FIG. 1. For example, the bandwidth manager 105 can determine the maximum outgoing bandwidth capability of the local network 107 and the current usage of the outgoing bandwidth. It can then subtract the current usage from the maximum capability to determine the available outgoing bandwidth.

At block 515, the bandwidth manager 105 allocates available outgoing bandwidth between the one or more requesting data services 110. For example, the bandwidth manager 105 can divide the available bandwidth between all the requesting data services 110. As discussed above, in some cases, the bandwidth manager may reserve a buffer amount of the bandwidth.

At decision block 520, the bandwidth manager 105 determines whether the data transmission (e.g., a backup data transfer) from the data service 110 is complete. In cases where the bandwidth manager 105 is handling requests from multiple data services 110, the bandwidth manager can determine whether each of the transmissions associated with each of the data services has completed. If the transmissions are complete, the routine 500 can end. If the transmissions are still ongoing, the routine proceeds back to block 510 so that the bandwidth manager 105 can determine if the network load has changed on the outgoing connection to the external network 135 from the local network 107 and re-allocate bandwidth as needed (e.g., either up or down).

In some embodiments, the above system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible. For example, the local network may include multiple networking devices such as, for example, switches, multiple routers, etc. In addition, the local network can include wired and/or wireless connections between devices.

In some embodiments, the above system and its components are executed or embodied by one or more physical or virtual computing systems. For example, in some embodiments, a server computing system that has components including a central processing unit (CPU), input/output (I/O) components, storage and memory may be used to execute some or all of the components of the above system. The I/O components can include a display, a network connection to the network, a computer-readable media drive and other I/O devices (e.g., a keyboard, a mouse, speakers, etc.).

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A bandwidth manager associated with a local network, the bandwidth manager comprising:
   memory that stores network load data for the local network, the network load data based at least partly on monitoring packet flows through a router of the local network; and
   one or more processors configured to:
      receive a request for bandwidth from a backup service operating on a first computing device on the local network;
      determine available local bandwidth for the first computing device based on the network load data for the local network;
      in response to determining the presence of other traffic on the local network that would be affected by transmission by the first computing device, determine a transmission wait time for the first computing device to wait before beginning the data transfer based on the network load data;
      cause the backup service of the first computing device to wait to begin operation until a time after the transmission wait time;
      allocate a first local bandwidth on the local network for a transmission after the transmission wait time to the first computing device based in part on the available local bandwidth; and
      during a data transmission by the backup service of the first computing device:
         monitor the other traffic on the local network; and
         adjust the allocated first local bandwidth, based in part on network load data of the other traffic.

2. The bandwidth manager of claim 1, wherein the first computing device is configured to delay transmission of data associated with the backup service for at least the transmission wait time.

3. The bandwidth manager of claim 1, wherein the first computing device is configured to transmit data stored on the first computing device to a destination storage device based on the first local bandwidth.

4. The bandwidth manager of claim 3, wherein the destination storage device is a network attached storage on the local network.

5. The bandwidth manager of claim 3, wherein the destination storage device is located on an external network.

6. The bandwidth manager of claim 1, wherein the one or more processors is further configured to allocate, to the first computing device, outgoing network bandwidth to an external network from the local network.

7. The bandwidth manager of claim 1, wherein the network load data includes current load on the local network.

8. The bandwidth manager of claim 1, wherein the network load data includes current outgoing load on an outgoing connection to an external network from the local network.

9. The bandwidth manager of claim 1, wherein the backup service stores data on the local network.

10. The bandwidth manager of claim 1, wherein the backup service stores data on an external network.

11. A method for managing bandwidth on a local network comprising:
- receiving a request for bandwidth from a first data service comprising a backup service operating on a first computing device on the local network;
- determining, by one or more processors, available local bandwidth for the first computing device based on network load data for the local network;
- in response to determining the presence of other traffic on the local network that would be affected by transmission by the first computing device, determining a transmission wait time for the first computing device to wait before beginning the data transfer based on the network load data;
- allocating a first local bandwidth to the first computing device based in part on the available local bandwidth;
- causing the backup service of the first computing device to wait to begin operation until a time after the transmission wait time; and
- during a data transmission by the backup service of the first computing device:
  - monitoring the other traffic on the local network; and
  - adjusting the allocated first local bandwidth, based in part on network load data of the other traffic, the network load data based at least partly on monitoring packet flows through a router of the local network.

12. The method of claim 11, wherein the first computing device is configured to delay transmission of data associated with the first data service for at least the transmission wait time.

13. The method of claim 11, wherein the first computing device is configured to transmit data stored on the first computing device to a destination storage device based on the first local bandwidth.

14. The method of claim 13, wherein the destination storage device is a network attached storage on the local network.

15. The method of claim 13, wherein the destination storage device is located on an external network.

16. The method of claim 11, further comprising allocating, to the first computing device, outgoing network bandwidth to an external network from the local network.

17. The method of claim 11, wherein the network load data includes current load on the local network.

18. The method of claim 11, wherein the network load data includes current outgoing load on an outgoing connection to an external network from the local network.

19. The method of claim 11, wherein the first data service stores data on the local network.

20. The method of claim 11, wherein the first data service stores data on an external network.

21. Non-transitory computer-readable storage having stored thereon instructions that, when executed, direct a computing device to perform operations comprising:
- receiving a request for bandwidth from a first data service comprising a backup service operating on a first computing device on a local network;
- determining, by one or more processors, available local bandwidth for the first computing device based on network load data for the local network;
- in response to determining the presence of other traffic on the local network that would be affected by transmission by the first computing device, determining a transmission wait time for the first computing device to wait before beginning the data transfer based on the network load data;
- causing the backup service of the first computing device to wait to begin operation until a time after the transmission wait time;
- allocating a first local bandwidth to the first computing device based in part on the available local bandwidth; and
- during a data transmission by the backup service of the first computing device:
  - monitoring the other traffic on the local network; and
  - adjusting the allocated first local bandwidth, based in part on network load data of the other traffic, the network load data based at least partly on monitoring packet flows through a router of the local network.

* * * * *